United States Patent
Bortels et al.

(10) Patent No.: US 11,734,470 B2
(45) Date of Patent: Aug. 22, 2023

(54) INTELLIGENT VOLUME MESHING FOR MODELLING ELECTROCHEMICAL PROCESSES

(71) Applicant: Elsyca N.V., Leuven (BE)

(72) Inventors: Leslie Edward John Bortels, Leuven (BE); Bart Juul Wilhelmina Van Den Bossche, Leuven (BE)

(73) Assignee: ELSYCA N.V., Leuven (BE)

( * ) Notice: Subject to any disclaimer, the term of this patent is extended or adjusted under 35 U.S.C. 154(b) by 493 days.

(21) Appl. No.: 15/829,110

(22) Filed: Dec. 1, 2017

(65) Prior Publication Data

US 2018/0157773 A1 Jun. 7, 2018

(30) Foreign Application Priority Data

Dec. 2, 2016 (EP) ..................................... 16201975

(51) Int. Cl.
*G06F 30/20* (2020.01)
*G06F 17/13* (2006.01)
*C25D 21/12* (2006.01)
*G06F 30/23* (2020.01)
*G06F 111/10* (2020.01)

(52) U.S. Cl.
CPC ............. *G06F 30/20* (2020.01); *C25D 21/12* (2013.01); *G06F 17/13* (2013.01); *G06F 30/23* (2020.01); *G06F 2111/10* (2020.01)

(58) Field of Classification Search
CPC .......... G06F 30/20; G06F 30/23; G06F 17/13; G06F 2111/10; C25D 21/12
See application file for complete search history.

(56) References Cited

U.S. PATENT DOCUMENTS

| 6,075,871 A * | 6/2000 | Simanovsky | G01V 5/005 250/363.04 |
| 2003/0182006 A1* | 9/2003 | Shin | C25D 13/22 700/97 |
| 2015/0013943 A1* | 1/2015 | Inagaki | F28D 15/046 165/104.26 |

OTHER PUBLICATIONS

Onishi et al., Numerical Simulation of Electropainting Using Boundary Element Method (Translation), 2011, Japan Society of Mechanical Engineers, pp. 1-36 (Year: 2011).*
Braun et al., Localized Electrodeposition and Pattering Using Bipolar Electrochemistry, 2015, Journal of the Electrochemical Society, pp. D180-D185 (Year: 2015).*

(Continued)

*Primary Examiner* — Boris Gorney
*Assistant Examiner* — Bernard E Cothran
(74) *Attorney, Agent, or Firm* — Workman Nydegger

(57) ABSTRACT

According to an embodiment, a computer-implemented method for modelling an electrochemical process is disclosed, the electrochemical process comprising treating a surface of an object in a container containing an electrolyte, the method comprising following steps: enclosing the object by a control surface; generating a mesh on the control surface; generating a mesh on the object; generating a mesh on the container walls, anode surfaces and electrolyte meniscus; generating a mesh of the electrolyte contained within the control surface; generating a mesh of the electrolyte surrounding the control surface and determining approximate and/or analytical solutions of partial differential equations describing said electrochemical process in each element of the mesh of the control surface and/or of the electrolyte.

14 Claims, 6 Drawing Sheets

(56) References Cited

OTHER PUBLICATIONS

Kim et al., Electrochemical Hydrodynamics Modeling Approach for a Copper Electrowinning Cell, 2013, International Journal of Electrochemical Science, pp. 12333-12347 (Year: 2013).*
Extended European Search Report from EP Application No. EP 16201975, dated Jun. 2, 2017.
Frei, "Deformed Mesh Interfaces: Rotations and Linear Translations," retrieved from www.comsol.com/blogs/deformed-mesh-interfaces-rotations-and-linear-translations/, downloaded on May 18, 2017, pp. 1-10.
Frei, "Model Translational Motion with the Deformed Mesh Interfaces," retrieved from www.comsol.com/blogs/model-translational-motion-with-the-deformed-mesh-interfaces/, downloaded on May 18, 2017, pp. 1-11.
Hess et al., "Automotive E-Coat Paint Process Simulation Using FEA," retrieved from www.algor.com/news_pub/tech_white_papers/e-coat_paint_process/?print=yes&, downloaded on May 19, 2017, pp. 1-20.
Kang et al., "A Sliding Mesh Technique for the Finite Element Simulation of Fluid-Solid Interaction Problems by Using Variable-Node Elements," Computers and Structures, vol. 130, 2014, pp. 91-104.
Mirsajedi et al., "A Multizone Moving Mesh Algorithm for Simulation of Flow Around a Rigid Body With Arbitrary Motion," Journal of Fluids Engineering, vol. 128, Mar. 2006, pp. 297-304.
Onishi et al., "Numerical Simulation of Electropainting Using Boundary Element Method," The Japan Society of Mechanical Engineering, 2011, pp. 1463-1477.

\* cited by examiner

INTELLIGENT VOLUME MESHING FOR MODELLING ELECTROCHEMICAL PROCESSES

FIELD OF THE INVENTION

The present invention generally relates to the modelling of electrochemical processes and more particularly, it relates to modelling and resolving electrochemical surface treatment processes such as electroplating, anodising, electro-colouring, electro-polishing or electrophoretic coating of an object or a set of objects.

BACKGROUND OF THE INVENTION

An electrochemical surface treatment process, such as for example electroplating, is a process wherein an electrical current reduces dissolved metal ions such that they may form a metal coating layer on an electrode. The metal ions originate from an electrolyte collected in a container, wherein electrodes are partially or completely submerged. The electrical current, which is imposed externally, initiates the electroplating process on an electrode that is connected to a negative pool of an electrical current source and the imposing is maintained until a desired distribution and thickness of the metal coating layer is reached. The desired distribution and thickness of the layer depends on the application wherefore the electrode will be used.

The electroplating process may be used to deliberately change surface properties of an object. In this case the electrode comprises an object or set of objects to be plated. Surface properties of the object or set of objects to be plated changes when predetermined cations are discharged and deposit on the surface of the object or set of objects. Again, an electrical current initiates and maintains the process.

Another example of an electrochemical surface treatment process is electrophoretic coating or also called e-coating. The e-coating process is used for depositing an organic paint film by means of an electrical charge. An industrial application of such an e-coating process is used in automobile manufacturing. The object comprises in this application a car body's sheet metal components that have been welded together. The object is than called a Body in White (BiW). An electrolyte containing charged paint particles is collected in a container and the BiW is first submerged in the container and further translated and possibly also rotated in the container such that the deposition of the charged paint particles is performed in a predetermined manner, thereby obtaining a coating layer, also called e-coat layer, on the BiW. The predetermined manner defines layer quality and thickness variations of the e-coat layer on the BiW. These layer quality and thickness variations, however, depend on a multitude of parameters like operating conditions, such as imposed electrical current or voltage difference, the way the BiW is translated and rotated in the container, but also on the shape of the BiW itself. Next, the process is performed incrementally, wherein for each stage in time these operating conditions may change. Furthermore, since in each time stage the e-coat layer thickens and therefore creates an additional resistivity for the electrical current, electrochemical process parameters change on time. Hence, operating conditions corresponding to these parameters needs to be identified for a series of time steps that con the entire process time.

A way to identify such operating conditions that meet demanded quality constraints, like quality and thickness variations of the coating layer, is by modelling the process. The modelling may be done by determining partial differential equations that describe the process and which comprise operating conditions, such as the electrical current and the characteristics of the electrolyte and the object or the set of objects. Next, via computational numerical techniques like, for example, a finite element method, these partial differential equations may be resolved. In order to do so, a mesh comprising elements, such as for example tetrahedrons or cubes, defining a discretized shape of the object or the set of objects and the electrolyte bounded by the container walls and the electrolyte meniscus needs to be generated. Such a mesh is generated for each time step of the process and by resolving the partial differential equations for each time step and in each element, a set of operating conditions may be determined.

It is however a drawback of this method that generating a mesh of the object or the set of objects and the electrolyte and subsequently resolving the partial differential equations in each element of the mesh is time consuming, especially since a new mesh needs to be generated for each time step of the process. Hence, there is a need for an improved method of modelling electrochemical processes such that the computation time needed to identify the set of operating conditions for the whole process is reduced.

SUMMARY

It is an objective of the present invention to disclose a method that oncomes the above identified shortcomings of existing solutions. More particularly, it is an objective to disclose a method wherein time required for modelling, generating a mesh and subsequently determining a set of operating conditions of an electrochemical surface treatment process is reduced.

According to a first aspect, this object is achieved by a computer-implemented method for modelling an electrochemical process, the electrochemical process comprising treating a surface of an object or a set of objects in a container containing an electrolyte and anodes, the container bounded by walls and the electrolyte bounded by the container walls and a meniscus, the method comprising following steps: enclosing the object or the set of objects by a control surface; generating a mesh on the control surface, said mesh comprising elements defining a discretized shape of the control surface; generating a mesh on the object or set of objects, said mesh comprising elements defining a discretized shape of the object or set of objects; generating a mesh on the container walls, anode surfaces and electrolyte meniscus, said mesh comprising elements defining a discretized shape of the container walls, anode surfaces and electrolyte meniscus; generating a mesh of the electrolyte contained within the control surface, said mesh comprising elements defining a discretized shape of the electrolyte contained within the control surface; generating a mesh of the electrolyte surrounding the control surface, said mesh comprising elements defining a discretized shape of the electrolyte surrounding the control surface; and determining approximate and/or analytical solutions of partial differential equations describing said electrochemical process in each element of the mesh on the control surface, the mesh on the object or set of objects and/or the mesh of the electrolyte surrounding the control surface.

Thus, the container comprises the electrolyte, the object or set of objects and anodes. The container is bounded by walls and the electrolyte is bounded by these walls and by a meniscus. Instead of generating a mesh of the entire electrolyte, the object or the set of objects in the container is first enclosed by a control surface. Next, a mesh on the control surface is generated, in addition to a mesh on the object or set of objects and a mesh on the container walls, anode surfaces and electrolyte meniscus. These meshes comprise elements and define a discretized shape. The electrolyte surrounding the mesh of the control surface is discretized as well through the generating of another mesh. Finally the electrolyte contained within the control surface is also discretized through the generating of another mesh. The electrochemical process is described by partial differential equations and by combining the partial differential equations with the mesh on the object or set of objects, the mesh on the container walls, anode surfaces and electrolyte meniscus, the mesh of the electrolyte that surrounds the mesh on the control surface and the mesh of the electrolyte contained within the control surface, the process is therefore modelled. Finally, by determining in each element of all four meshes solutions of these partial differential equations, physical quantities are identified which correspond to operating conditions of the electroplating process. These solutions may be approximated or analytically solved, or even be combined by approximating them in a number of elements and analytically solving them in other elements.

The advantage of enclosing the object or the set of objects by a control surface and subsequently generating a mesh of the electrolyte surrounding the control surface and generating another mesh of the electrolyte enclosed within the control surface, instead of generating a single mesh on the entire electrolyte volume that encompasses both the electrolyte surrounding the control surface and the electrolyte enclosed within the control surface, is that such a combined mesh may be used to determine operating conditions for objects or sets of objects of different shapes. If adaptations are made to the object or the set of objects, but if this object or set of objects may be enclosed by a same control surface compared to that for the initial object or initial set of objects, then there is no need for generating a new mesh of the electrolyte surrounding the control surface. Only the mesh of the electrolyte enclosed within the control surface needs to be regenerated. The time needed to determine operating conditions for different objects or different sets of objects may therefore be reduced.

During the electrochemical process, for example an electroplating process, a layer on the object or on the set of objects may grow to a significant thickness, thereby adapting the shape of the object or the set of objects. By using a control surface there is no need to generate a new mesh of the electrolyte surrounding the mesh of the control surface, but only the mesh on the object or the set of objects needs to be regenerated, which reduces the computation time to determine operating conditions.

An electrochemical process, such as for example electroplating, may also be performed in different containers, each container having different dimensions and/or a different anode, also called counter electrode, arrangement for imposing an electrical current. The set of objects may be enclosed by a single control surface that fits in each of the different containers. The electrolyte contained within the control surface needs to be meshed only once prior to be used for simulations in each of the containers. Moreon, the electrolyte in a container surrounding the control surface needs to be meshed only once for each different container. The advantage is that different simulations may be performed for each of the containers in a much faster way.

Instead of enclosing a set of objects by a single control surface, the method also may be performed by enclosing several objects or several sets of objects in the container by a control surface per object or per set of objects. For example, in an electrophoretic coating process the container may comprise several BiWs such that each BiW is enclosed by a control surface and a mesh is generated of the electrolyte contained within each control surface and subsequently a mesh of the electrolyte surrounding said control surfaces is generated. The control surfaces that reside in the container, as well as the object or set of objects they enclose might be identical or different in shape.

According to an embodiment, the method further comprises: incrementally translating and/or rotating the mesh on the control surface and the mesh of the electrolyte contained within the control surface; generating an adapted mesh of the electrolyte surrounding the translated and/or rotated control surface, said adapted mesh of the electrolyte comprising elements defining a discretized shape of the electrolyte surrounding the translated and/or rotated control surface; and determining approximate and/or analytical solutions of partial differential equations describing said electrochemical process in each element of the adapted mesh, of the mesh on the control surface, of the mesh on the object or set of objects and/or of the mesh of electrolyte contained within the control surface.

During an electrochemical process, for example an electrophoretic process, the object or the set of objects may also be moved in the electrolyte. This movement may be expressed as translations and/or rotations of the object or the set of objects relative to the electrolyte or the container. The translations and/or rotations are incrementally partitioned in time depending on the required accuracy of the modelling. For each incremental movement, the mesh on the control surface, the mesh on the object or the set of objects and the mesh of the electrolyte contained within the control surface in the container is translated and/or rotated according to a trajectory that corresponds to the movement of the object or the set of objects. Next, a mesh is generated of the electrolyte surrounding this translated and/or rotated mesh of the control surface. Finally, the operating conditions for each stage or time step of the electrochemical process may be determined by repeating the steps in the method and subsequently determining solutions, by approximation, analytically or combined, of the partial differential equations.

There is no need to create a new mesh on the object or the set of objects nor on the control surface, nor of the electrolyte contained within the control surface in the container if the object or the set of objects is moved in the container. The advantage of reusing said meshes and generation of only a mesh of the electrolyte surrounding this moved control surface is that it reduces computation time for determining operating conditions of an electrochemical process with a movable object or set of objects.

According to an embodiment, the elements defining the discretised shape of the electrolyte contained within the control surface and the elements defining the discretised shape of the electrolyte surrounding the control surface correspond to finite elements.

A way to generate a mesh of the electrolyte surrounding the mesh of the control surface as well as the electrolyte contained in the control surface is through the use of finite elements.

The advantage of using finite elements for either the electrolyte volume surrounding the mesh of the control surface as well as the electrolyte contained in the control surface is that changes regarding to media characteristics in space within one or both volumes may be tackled.

According to an embodiment, the elements defining the discretised shape of the electrolyte contained within the control surface correspond to boundary elements and the elements defining the discretised shape of the electrolyte surrounding the control surface correspond to finite elements.

Another way to generate a mesh of the electrolyte contained within the control surface is through the use of boundary elements that are provided by the mesh on the control surface and by the mesh on the object or set of objects. The mesh contained of the electrolyte in the control surface thus consists of the mesh on the control surface and the mesh on the object or set of objects. For the mesh of the electrolyte surrounding the control surface finite elements are used.

An advantage of using boundary elements in order to generate a mesh of the electrolyte contained within the control surface is that there is no need for generating the mesh of the electrolyte contained within the control surface.

According to an embodiment, the elements defining the discretised shape of the electrolyte contained within the control surface correspond to finite elements and the elements defining the discretised shape of the electrolyte surrounding the control surface correspond to boundary elements.

A third way for generating a mesh of the electrolyte surrounding the control surface is through the use of boundary elements that are provided by the mesh on the control surface and by the mesh on the container walls, anode surfaces and electrolyte meniscus, and the use of finite elements for the electrolyte contained within the control surface.

An advantage of using boundary elements in order to generate a mesh of the electrolyte surrounding the control surface is that there is no need for generating the mesh of the electrolyte surrounding the control surface but that the meshes of the container walls, anode surfaces and electrolyte meniscus may be used.

According to an embodiment, the elements of the mesh on the control surface, the mesh on the object or set of objects and the mesh on the container walls, anode surfaces and electrolyte meniscus comprise polygons.

The control surface does not need to reflect the shape of the object or the set of objects but may be constructed using any type of flat or curved surfaces. The surfaces may correspond to a surface of the object or the set of objects enclosed, but may also be of considerable simpler shape. This not only results in a less complex shape of the control surface compared to that of the object or the set of objects, but also ensures that standard elements, such as for example tetrahedrons or cubes, may be used to generate a mesh of the control surface. Since complexity may be reduced and standard elements may be used, the time to generate a mesh may be reduced as well.

According to an embodiment, the number of elements of the mesh per volume unit of the discretized shape of the electrolyte contained within the control surface exceeds the number of elements of the mesh per volume unit of the discretized shape of the electrolyte surrounding the control surface.

If a mesh is generated, the number of elements per volume unit used to discretize the electrolyte contained within the control surface and the electrolyte surrounding the control surface does not have to be distributed uniformly. Due to the objective of the modelling, namely identifying operation conditions for surface treatment of an object or a set of objects, it is preferable that, for example, the electrolyte contained within the control surface is discretized in a more dense way compared to the electrolyte surrounding the control surface. The number of elements per volume unit of the discretized shape of the electrolyte contained within the control surface may therefore exceed the number of elements per volume unit of the discretized shape of the electrolyte surrounding the control surface.

Since the mesh of the electrolyte surrounding the control surface is coarser compared to that of the electrolyte contained within the control surface, the generation of the mesh of the electrolyte surrounding the control surface may be performed in a faster way while the desired modelling accuracy is maintained.

According to an embodiment, the electrochemical process is described by a vectorial electrical current density distribution in the container required for said surface treatment of the object or set of objects.

The electrical current vector field will vary in time for each time step of the process and also varies according to the location in the electrolyte. By describing the electrochemical process by a vectorial electrical current density distribution in each point of the electrolyte, the process is mapped in such a way that the physical quantity that initiates and maintains the process is determined.

According to an embodiment, the partial differential equations comprise media characteristics of the electrolyte and/or boundary conditions at an electrolyte-electrode interface.

Medium characteristics of the electrolyte may, for example, include an electrical conductivity, a magnetic permeability and/or a permittivity. Specific boundary conditions at an electrolyte-electrode interface may, for example, include relations between a local current density perpendicular to the electrode surface and a potential difference between the electrolyte and the electrode.

According to an embodiment, the partial differential equations comprise a Laplace, a Poisson, a Helmholtz, an Euler and/or a Navier-Stokes equation.

The method may thus be used when a direct electrical current is imposed for each stage in time, but also for alternating currents. In the former case a Laplace equation is resolved while for the latter this is a Helmholtz equation. When additional current sources originating in the electrolyte itself, whether or not time dependent or independent, needs to be taken into account, a Poisson equation will be resolved. Further, the method also may be used to solve fluid dynamics thereby solving an Euler equation, or to describe a motion of a flow, thereby solving a Navier-Stokes equation.

According to a second aspect, the invention also relates to a computer program product comprising computer-executable instructions for performing the method according to the first aspect when the program is run on a computer.

According to a third aspect, the invention relates to a computer readable storage medium comprising the computer program product according to the second aspect.

According to a fourth aspect, the invention relates to a data processing system programmed for carrying out the method according the first aspect.

DETAILED DESCRIPTION OF EMBODIMENT(S)

Figure 1:
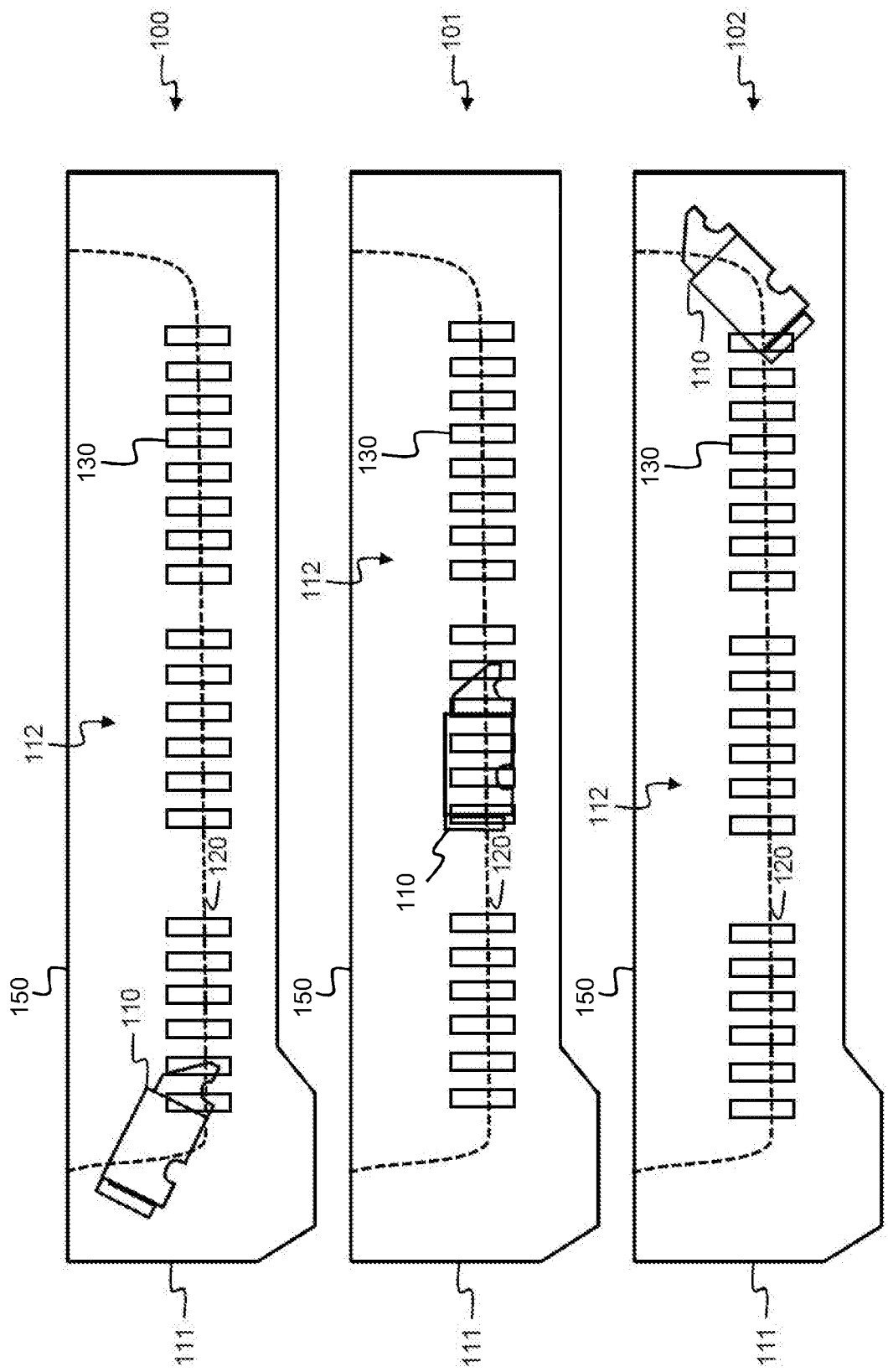
FIG. 1 schematically illustrates an electrophoretic coating process.

According to an embodiment, the invention relates to a computer-implemented method for modelling an electrochemical process comprising treating a surface of an object or a set of objects. Such an electrochemical process may, for example, be an electrophoretic coating process also called an e-coating process. An industrial application of such an e-coating process is the deposition of a primer coat on a vehicle structure or Body-in-White (BiW) used in automobile manufacturing. FIG. 1 schematically illustrates such an e-coating process.

A vehicle structure or BiW, for example 110, enters a container 111 and follows a trajectory 120, also called an e-coat line, in the container 111 during the process. The container 111 further comprises an electrolyte 112 and electrodes such as electrode 130. The electrolyte is bounded by the container 111 walls and electrolyte meniscus 150. The electrolyte 112 may, for example, comprising charged paint particles and during the e-coating process the charged paint particles in the electrolyte 112 are deposed on the BiW 110. At the end of the process, the BiW 110 leaves the container 111.

The process is a continuous process, but may be represented as a sequence of time steps in which the BiW 110 follows the trajectory 120. A first step 100 may, for example, be at the time of that the BiW 110 enters the container 111 and is submerged in the electrolyte 112; a second step 101 when the BiW 110 is located in the middle of the container 111; and a third step 102 when the BiW 110 leaves the container 111, but still is submerged in the electrolyte 112.

Figure 2:
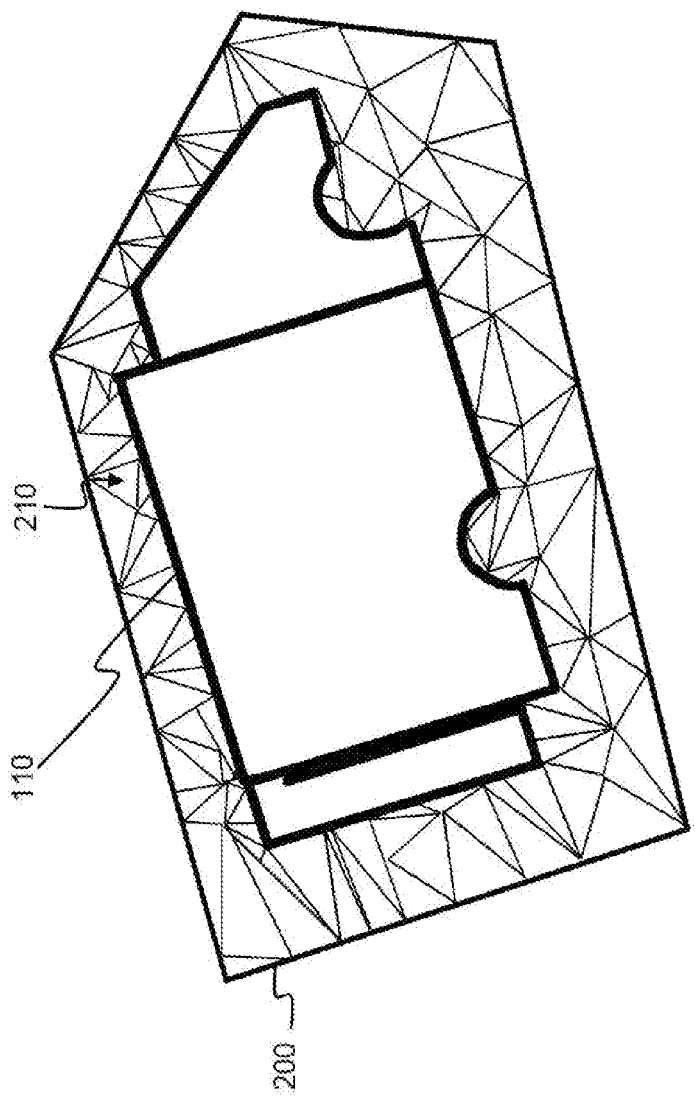
FIG. 2 schematically illustrates a control surface enclosing an object and a mesh of the electrolyte inside a control surface.

Prior to simulations in order to determine approximate and/or analytical solutions of partial differential equations describing the electrophoretic coating process in order to determine operating conditions for the whole process, the BiW 110 is enclosed by a control surface. FIG. 2 illustrates such a control surface enclosing the BiW.

Figure 3:
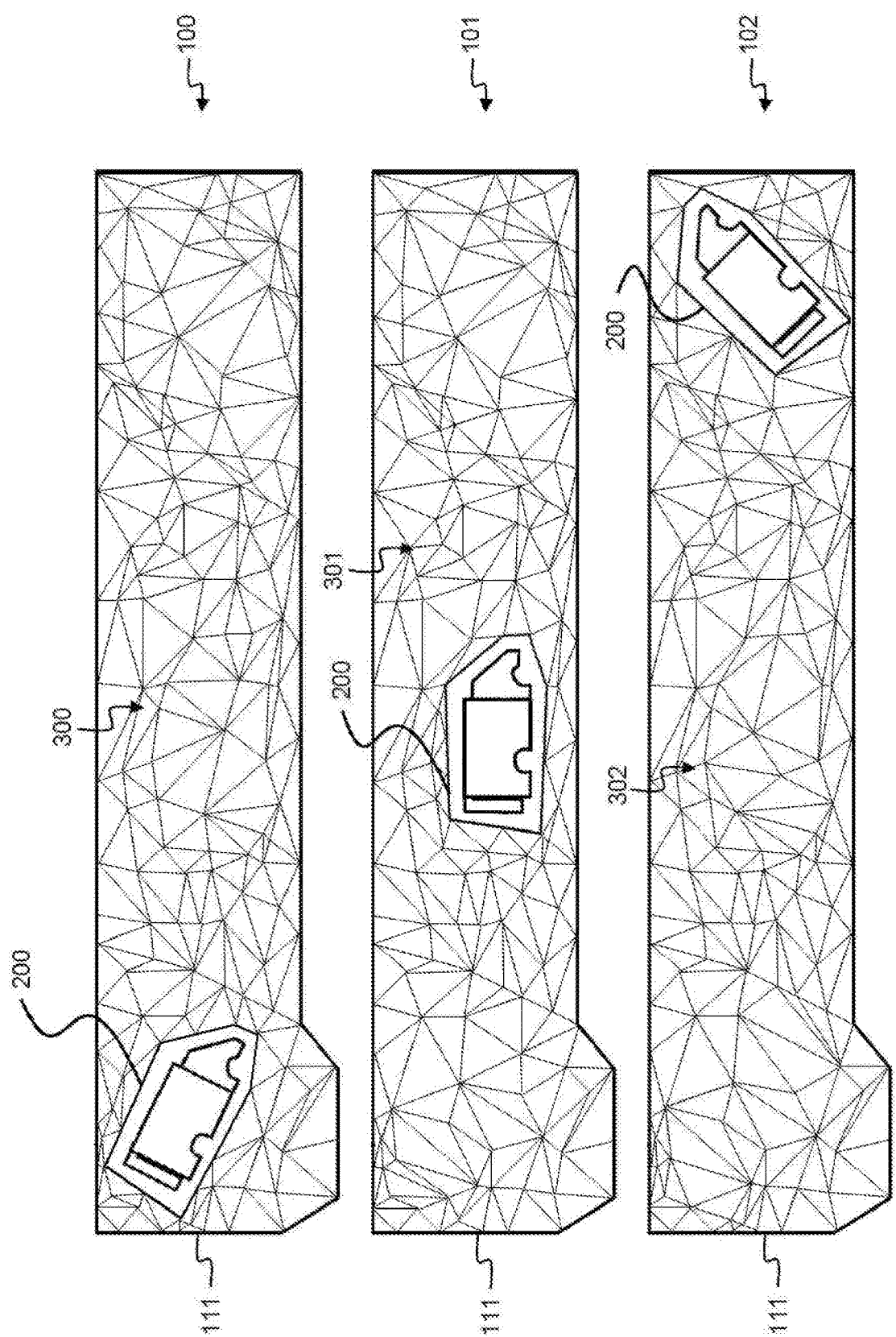
FIG. 3 schematically illustrates a mesh of an electrolyte outside a control surface in an electrophoretic coating process.

The BiW 110 is enclosed by a control surface 200 which, according to an embodiment, may exceed the volume of the BiW 110. The shape of the control surface 200 does not have to correspond to the shape of the BiW 110, but may be approximated by a simple shape. Next, a mesh of the inner electrolyte volume enclosed by the control surface 200 is generated. According to an embodiment, the mesh 210 comprises finite elements defining a discretized shape of the inner electrolyte volume enclosed by the control surface 200. For each time step 100, 101 and 102 the control surface 200 and the mesh of the inner volume 210 is retained. FIG. 3 schematically illustrates the retention of the control surface 200 for each time step 100, 101 and 102.

In the first time step 100, a mesh 300 of the electrolyte 112 in the container 111 is generated and approximate and/or analytical solutions are determined in each element of the mesh 300 for this first time step 100. In the second time step 101, the mesh 210 of the electrolyte contained within the control surface 200 is retained after having been rotated and translated along the trajectory 120, while a new mesh 301 of the electrolyte surrounding the control surface 112 is generated and subsequently solutions are again determined. In the final time step 102, a third mesh 302 of the electrolyte 112 surrounding the control surface is generated and the mesh 210 of the electrolyte contained within the control surface 200 is again retained and approximate and/or analytical solutions in each element are determined.

Figure 4:
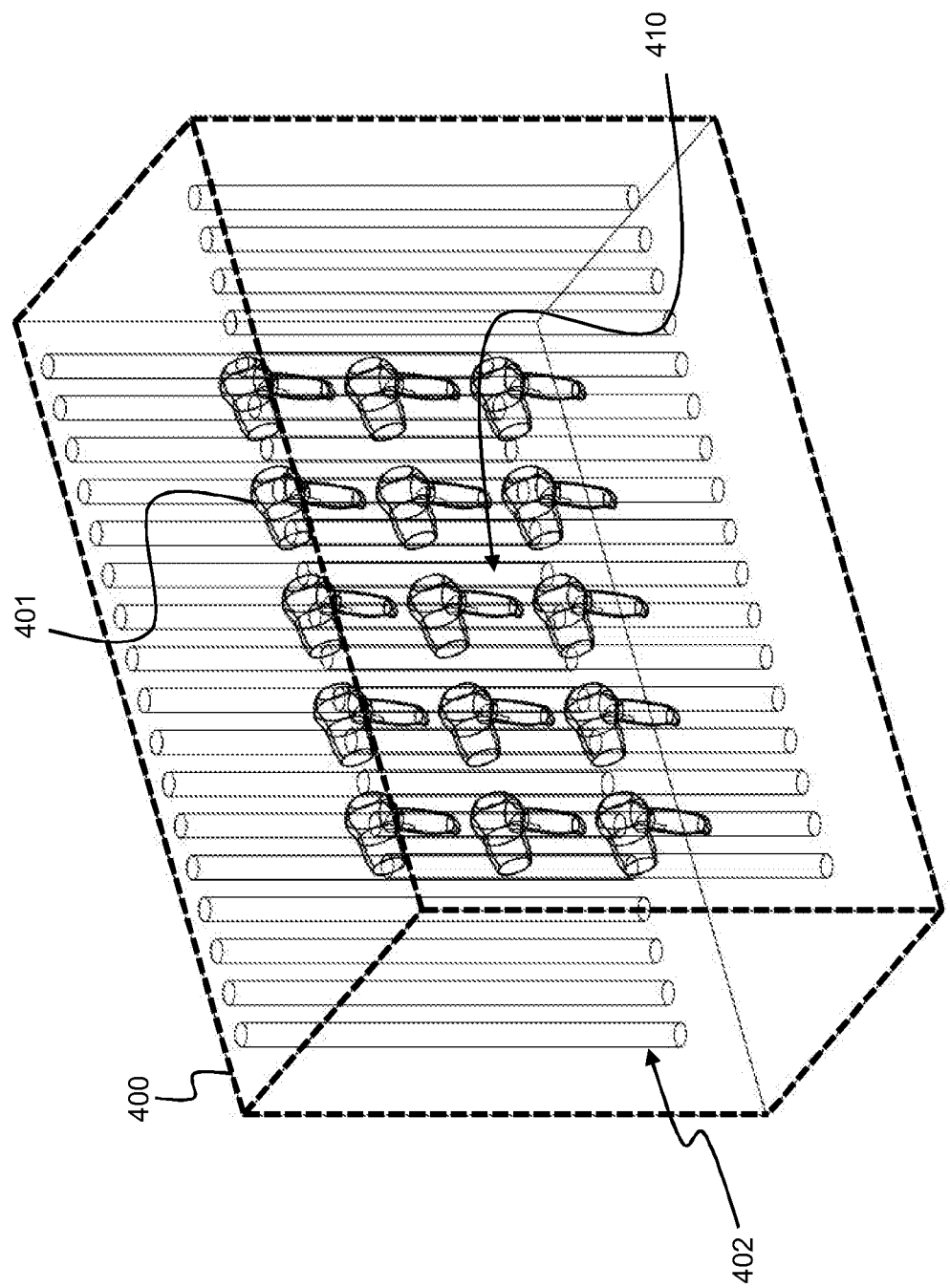
FIG. 4 schematically illustrates an electroplating process for a set of objects performed in a container comprising vertically arranged and cylindrically shaped counter electrodes.

According to an embodiment, the computer-implemented method may also be used to perform simulations of an electroplating process. FIG. 4 schematically illustrates an electroplating process performed in a container.

Figure 5:
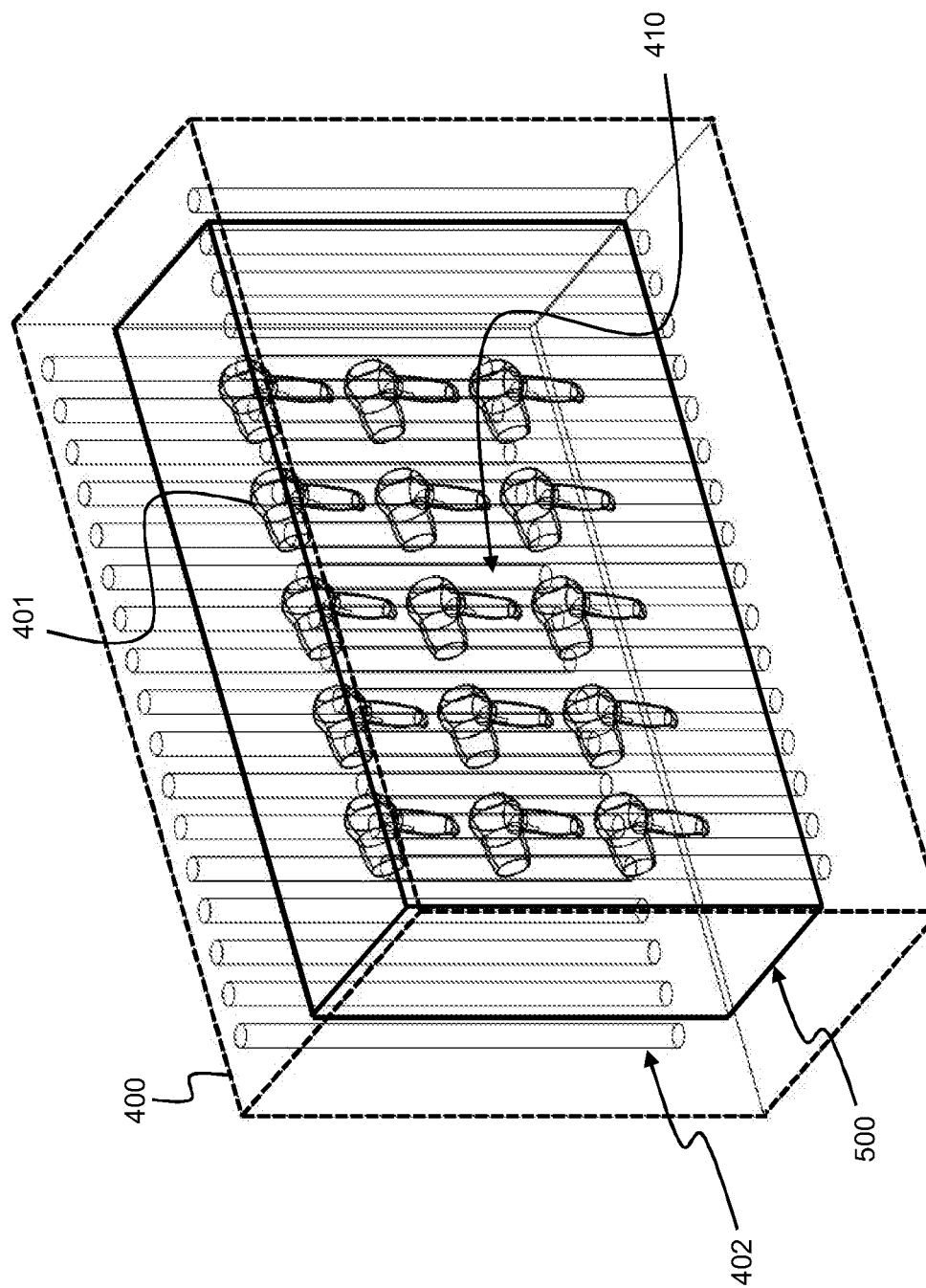
FIG. 5 schematically illustrates a cuboid shaped control surface enclosing a set of objects in a container comprising vertically arranged and cylindrically shaped counter electrodes.

A container 400 comprises, for example, cylindrical raised counter electrodes, such as electrode 402 and an electrolyte. The electrodes may be positioned at two sides of the container 400 and are used to impose an electrical current. The container 400 further comprises a set of objects 410, such as object 401. On each object a coating layer is deposed during the electroplating process. Prior to simulating the electroplating process, the set of objects 410 may be enclosed by a control surface. FIG. 5 schematically illustrates such an enclosure.

Figure 6:
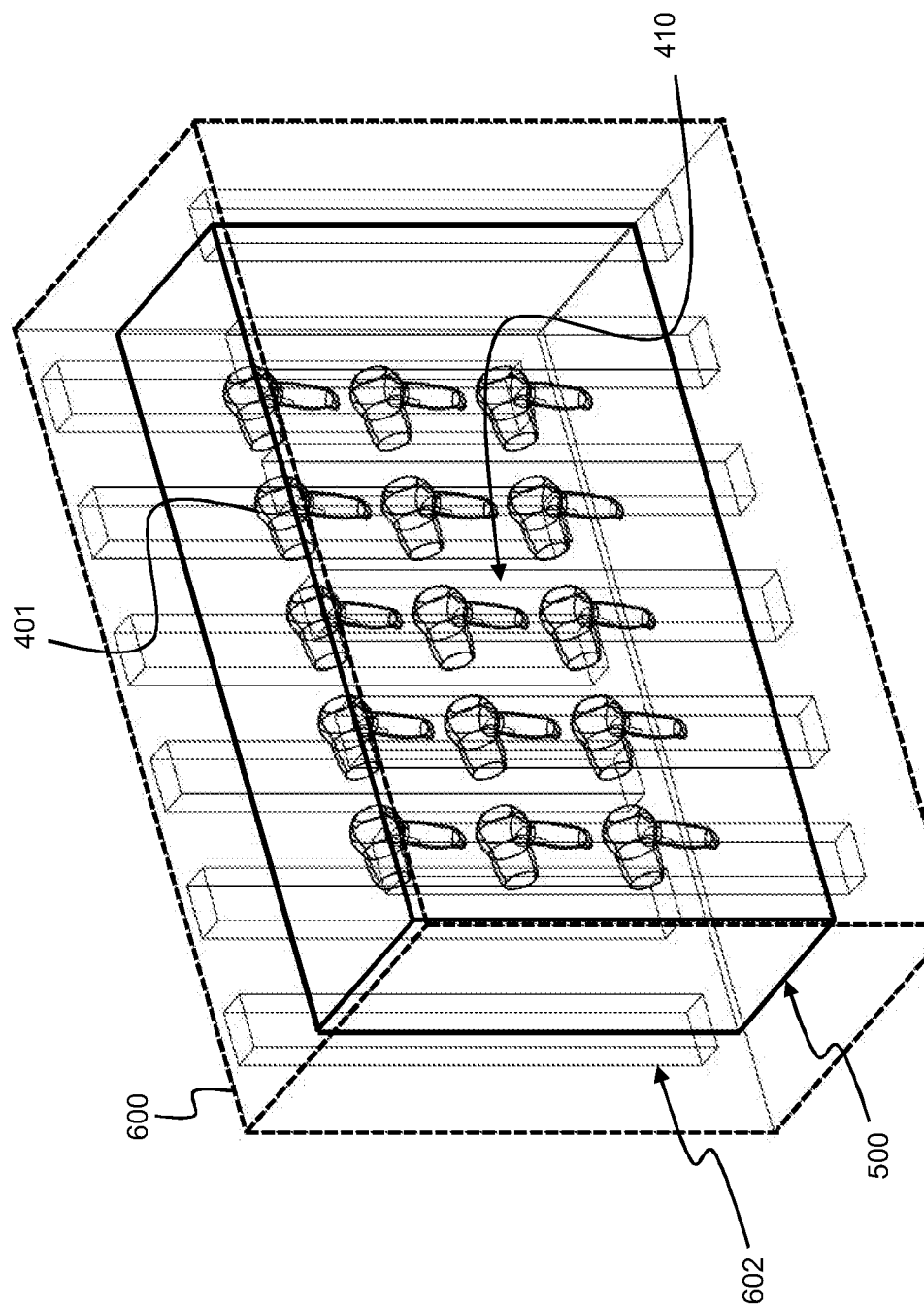
FIG. 6 schematically illustrates a cuboid shaped control surface enclosing a set of objects in a container comprising cuboid shaped counter electrodes.

The set of objects 410 is enclosed by a control surface such as for example 500. Next, a mesh may be generated of the electrolyte contained within the control surface 500 comprising the set of objects 410. A mesh of the electrolyte in the container 400 surrounding the control surface 500 is generated as well and subsequently partial differential equations describing the electroplating process may be resolved. An electroplating process may also be performed in another container comprising the same set of objects 410. FIG. 6 schematically illustrates such other container.

Instead of a container 400 comprising cylindrical raised counter electrodes, such as 402, a container 600 of different dimensions compared to container 400 may be used and may comprise cuboid shaped electrodes, such as, for example, 602. Instead of generation a mesh of the whole arrangement, the control surface 500 enclosing the set of objects 410 may be reused and be positioned in the container 600. Since already a mesh is generated of the electrolyte contained within the control surface 500 only a mesh needs to be generated of the electrolyte in the container 600 surrounding the control surface 500.

The invention claimed is:

1. A computer-implemented method for modelling an electrochemical process, the method comprising following steps:

generating, with a processor, a model of an object or set of objects in a container containing an electrolyte and counter electrodes, the container bounded by walls and the electrolyte bounded by the container walls, the counter electrodes and a meniscus, enclosing the model of the object or the set of objects and a first portion of the electrolyte by a control surface generated by the processor, said control surface being surrounded by a second portion of the electrolyte;

generating a mesh on the control surface, said mesh comprising elements defining a discretized shape of the control surface;

generating, with the processor, a mesh on the object or set of objects, said mesh comprising elements defining a discretized shape of the object or set of objects;

generating, with the processor, a mesh on the container walls, counter electrode surfaces and electrolyte meniscus, said mesh comprising elements defining a discretized shape of the container walls, counter electrode surfaces and electrolyte meniscus;

generating, with the processor, a mesh of the first portion of the electrolyte contained within the control surface, said mesh comprising elements defining a discretized shape of the first portion of the electrolyte contained within the control surface;

generating, with the processor, a mesh of the second portion of the electrolyte surrounding the control surface, said mesh comprising elements defining a discretized shape of the second portion of the electrolyte surrounding the control surface; and determining, with the processor, approximate and/or analytical solutions of partial differential equations describing said electrochemical process in each element of the mesh on the control surface, the mesh on the object or set of objects and/or the mesh of the second portion of the electrolyte surrounding the control surface.

2. The method according to claim 1, further comprising:

incrementally translating and/or rotating the mesh on the control surface and the mesh of the first portion of the electrolyte contained within the control surface;

generating, with the processor, an adapted mesh of the second portion of the electrolyte surrounding the translated and/or rotated control surface, said adapted mesh of the second portion of the electrolyte comprising elements defining a discretized shape of the second portion of the electrolyte surrounding the translated and/or rotated control surface; and determining, with the processor, approximate and/or analytical solutions of partial differential equations describing said electrochemical process in each element of the adapted mesh, of the mesh on the control surface, of the mesh on the object or set of objects and/or of the mesh of the first portion of the electrolyte contained within the control surface.

3. The method according to claim 1, wherein the elements defining the discretised shape of the first portion of the electrolyte contained within the control surface and the elements defining the discretised shape of the second portion of the electrolyte surrounding the control surface correspond to finite elements.

4. The method according to claim 1, wherein the elements defining the discretised shape of the first portion of the electrolyte contained within the control surface correspond to boundary elements and wherein the elements defining the discretised shape of the second portion of the electrolyte surrounding the control surface correspond to finite elements.

5. The method according to claim 1, wherein the elements defining the discretised shape of the first portion of the electrolyte contained within the control surface correspond to finite elements and wherein the elements defining the discretised shape of the second portion of the electrolyte surrounding the control surface correspond to boundary elements.

6. The method according to claim 1, wherein the elements of the mesh on the control surface, the mesh on the object or set of objects and the mesh on the container walls, counter electrode surfaces and electrolyte meniscus comprise polygons.

7. The method according to claim 1, wherein the number of elements of the mesh per volume unit of the discretized shape of the first portion of the electrolyte contained within the control surface exceeds the number of elements of the mesh per volume unit of the discretized shape of the second portion of the electrolyte surrounding the control surface.

8. The method according to claim 1, wherein the volume enclosed by the control surface exceeds the volume of the object or the set of objects.

9. The method according to claim 1, wherein the electrochemical process is described by a vectorial electrical current density distribution in the container required for said surface treatment of the object or set of objects.

10. The method according to claim 1, wherein the partial differential equations comprise media characteristics of the electrolyte and/or boundary conditions at an electrolyte-electrode interface.

11. The method according to claim 1, wherein the partial differential equations comprise a Laplace, a Poisson, a Helmholtz, an Euler and/or a Navier-Stokes equation.

12. A non-transitory computer readable storage medium comprising a computer program product, the computer program product comprising computer-executable instructions for performing the method according to claim 1 when the program is run on a computer.

13. A method for performing an electrochemical process on a body, comprising:

modelling the electrochemical process to determine operating conditions for said process, and treating a surface of the body under said determined operating conditions, wherein said modelling the electrochemical process comprises:

generating, with a processor, a model of an object or set of objects in a container containing an electrolyte and counter electrodes, the container bounded by walls and the electrolyte bounded by the container walls, the counter electrodes and a meniscus, enclosing the object or the set of objects and a first portion of the electrolyte by a control surface generated by the processor, said control surface being surrounded by a second portion of the electrolyte;

generating a mesh on the control surface, said mesh comprising elements defining a discretized shape of the control surface;

generating, with the processor, a mesh on the object or set of objects, said mesh comprising elements defining a discretized shape of the object or set of objects;

generating, with the processor, a mesh on the container walls, counter electrode surfaces and electrolyte meniscus, said mesh comprising elements defining a discretized shape of the container walls, counter electrode surfaces and electrolyte meniscus;

generating, with the processor, a mesh of the first portion of the electrolyte contained within the control surface, said mesh comprising elements defining a discretized shape of the first portion of the electrolyte contained within the control surface;

generating, with the processor, a mesh of the second portion of the electrolyte surrounding the control surface, said mesh comprising elements defining a discretized shape of the second portion of the electrolyte surrounding the control surface; and determining, with the processor, approximate and/or analytical solutions of partial differential equations describing said electrochemical process in each element of the mesh on the control surface, the mesh on the object or set of objects and/or the mesh of the second portion of the electrolyte surrounding the control surface.

14. A computer-implemented method for modelling an electrochemical process such that computation time needed to identify a set of operating conditions for the whole electrochemical process is reduced, the method comprising following steps:

generating, with a processor, a model of an object or set of objects in a container containing an electrolyte and counter electrodes, the container bounded by walls and the electrolyte bounded by the container walls, the counter electrodes and a meniscus, enclosing the object or the set of objects and a first portion of the electrolyte by a control surface generated by the processor, said control surface being surrounded by a second portion of the electrolyte;

generating a mesh on the control surface, said mesh comprising elements defining a discretized shape of the control surface;

generating, with the processor, a mesh on the object or set of objects, said mesh comprising elements defining a discretized shape of the object or set of objects;

generating, with the processor, a mesh on the container walls, counter electrode surfaces and electrolyte meniscus, said mesh comprising elements defining a discretized shape of the container walls, counter electrode surfaces and electrolyte meniscus;

generating, with the processor, a mesh of the first portion of the electrolyte contained within the control surface, said mesh comprising elements defining a discretized shape of the first portion of the electrolyte contained within the control surface;

generating, with the processor, a mesh of the second portion of the electrolyte surrounding the control surface, said mesh comprising elements defining a discretized shape of the second portion of the electrolyte surrounding the control surface; and simulating, with the processor and based on the generated model, the electrochemical process and determining approximate and/or analytical solutions of partial differential equations describing said electrochemical process in each element of the mesh on the control surface, the mesh on the object or set of objects and/or the mesh of the second portion of the electrolyte surrounding the control surface.

* * * * *